United States Patent

Treuthart

[15] 3,649,105
[45] Mar. 14, 1972

[54] OPTICAL SHUTTER

[72] Inventor: Robert L. Treuthart, Villa Park, Calif.
[73] Assignee: North American Rockwell Corporation, El Segundo, Calif.
[22] Filed: Feb. 21, 1968
[21] Appl. No.: 707,925

[52] U.S. Cl. ............................................. 350/285, 350/161
[51] Int. Cl. ........................................................... G02f 1/34
[58] Field of Search ........................................ 350/161, 285

[56] References Cited

UNITED STATES PATENTS

| | | | |
|---|---|---|---|
| 2,565,514 | 8/1951 | Pajes | 350/285 |
| 2,281,280 | 4/1942 | Gabor | 350/161 |
| 2,997,922 | 8/1961 | Kaprelian | 350/285 |
| 3,338,656 | 8/1967 | Astheimer | 350/285 |
| 3,514,183 | 5/1970 | Rabedeau | 350/285 |
| 3,389,348 | 6/1968 | De Maria | 331/94.5 |
| 3,458,829 | 7/1969 | Pole et al. | 350/285 |

*Primary Examiner*—Ronald L. Wibert
*Assistant Examiner*—Jeff Rothenberg
*Attorney*—L. Lee Humphries

[57] ABSTRACT

A wedge of transparent material having first and second angularly displaced faces is positioned in a controllable manner with respect to a right angle prism with one of the faces of the wedge parallel to the hypotenuse face of the prism. A piezoelectric element is positioned to drive the wedge relative to the prism between a first position wherein the wedge and prism are in near optical contact and a second position wherein the wedge and prism are spaced by a distance of about one wavelength of the light incident upon the prism so as to switch the optical path of the incident light beam from a condition of transmission to a condition of transmission to a condition of reflection at the hypotenuse face.

20 Claims, 4 Drawing Figures

INVENTOR.
ROBERT L. TREUTHART

ATTORNEY

INVENTOR.
ROBERT L. TREUTHART

ATTORNEY

OPTICAL SHUTTER

BACKGROUND OF THE INVENTION

1. Field of the Invention

The present invention relates to an optical shutter and, more particularly, to a piezoelectrically actuated optical shutter for switching an optical path from a condition of transmission to a condition of reflection at a controlled interface.

2. Description of the Prior Art

Ever since the invention of the laser, many practical uses have been proposed therefor based upon its property of producing a high intensity, highly collimated beam of light. For example, this property makes the laser extremely valuable in optical communication systems and in optical radar systems. When used in radar or other types of optical ranging systems, the laser is generally operated in a pulsed mode. Such a mode is preferred because of the ability of the laser to provide good range resolution and large range with a narrow width and high peak power pulse of light.

A typical pulsed laser consists of a lasing element, an excitation source, and a pair of reflectors which are positioned, relative to the lasing element, to form a high Q optical cavity, one of the reflectors being partially reflecting to provide an output beam. With such a configuration, the light beam generated by the lasing element is reflected back upon itself by the reflectors to provide the feedback necessary to encourage stimulated emission. To operate the laser, the excitation source is pulsed and the lasing element begins to oscillate. If no other apparatus is added to the laser cavity, the laser will generate a high energy pulse of light which may be spread out over a period of as high as 200 microseconds. Although such a pulse is satisfactory for many applications, in most cases it is not. In order to determine range with good range resolution, it is necessary that the pulse be as narrow as possible. In addition, since the range of the system is a function of the peak amplitude of the pulse, it is desirable to narrow the pulse to a considerable degree in order to increase the energy per unit of time.

The most common technique for decreasing the pulse width is based on the fact that the ability of the laser cavity to oscillate is dependent upon the alignment of all the optical surfaces, i.e., the reflectors and the front and rear surfaces of the lasing element. Since all these surfaces have to be very carefully aligned in order for the laser to oscillate, the alignment of the rear reflector may be manipulated to control oscillation. What is done is that the rear reflector is badly misaligned, lowering the Q of the cavity to a point where the laser will not oscillate. The excitation source is then flashed and a finite period of time allowed to lapse to allow the lasing element to reach the metastable state, at which time the lasing element has stored therein the maximum amount of energy. At this point in time, the rear reflector is swung back into alignment with the remainder of the optical surfaces in the cavity, whereupon the Q becomes very high. Since the lasing element now sees a cavity of high Q, it begins to oscillate and discharges its energy in a short period of time, i.e., on the order of 100 nanoseconds.

Such a Q switch is generally mechanized by mounting the rear reflector on a motor and driving the motor at a constant velocity. Electronic circuitry is then required to sense the position of the motor and to trigger the flash lamp at a time such that when the mirror reaches the aligned position, the lasing element is in the metastable state.

Although operative, such a Q switch is inherently too slow to provide high peak power pulses with a width less than approximately 100 nanoseconds. In addition, such a Q switch does not have a well defined high Q position, which causes the output beam to be smeared through a small angle. Finally, since speeds of operation of as high as 24,000 r.p.m. are usually required, the apparatus is very noisy and the rotating mirror tends to become misaligned.

To provide better operation, electro-optic Q switches have been made using liquids or solids which exhibit the Kerr effect. In order to build a Q switch utilizing a Kerr cell, a linear polarizer and a Kerr cell are placed in the laser cavity and all of the reflecting surfaces are made stationary. The light emanating from the lasing element passes through the linear polarizer and is incident upon the Kerr cell. With a proper voltage applied thereto, the light exits from the Kerr cell with a plane of polarization which is rotated 45° with respect to the incident beam. The light is then reflected off the rear mirror and again passes through the Kerr cell where it is rotated by another 45°. When the light which is now rotated 90° reached the polarizer, it will be rejected, thereby preventing the laser cavity from oscillating. It is, therefore, apparent that such a technique can be used to keep the laser off while the lasing element reaches the metastable state. At that time, the voltage can be removed from the Kerr cell permitting the laser to emit a high power, narrow width pulse.

Although it is theoretically possible to operate a Q switch with a Kerr cell in the manner described above, such a technique has several problems. A primary problem is the fact that a liquid cell can only be used with a laser having a low average power. If such a cell is used with a high average power laser, the light passing through the cell has the effect of heating the liquid therein and causing waves of different temperature to pass through the cell. As a result, the entire cross section of the light beam passing through the cell does not encounter a liquid of constant temperature, resulting in severe abberations in the output beam.

SUMMARY OF THE INVENTION

According to the present invention, there is provided a piezoelectrically actuated optical shutter for switching the path of a beam of light at a controlled interface. The beam incident on the present device may be transmitted out of the device or reflected back through the controlled interface along the path of incidence. Thus, the present invention can cause a light beam to be switched from one path to another, or with the use of a reflector, can cause a light beam to be reflected back upon itself. For example, the present device can be employed with a laser oscillator to switch an optical path from a condition wherein the light beam is prevented from returning upon itself to a condition wherein a high Q optical cavity is generated, thereby providing that feedback required to encourage stimulated emission in the laser cavity so that an output beam may be provided.

The present invention comprises two blocks of transparent media having plane parallel faces spaced in a controllable manner and actuating means to displace one block relative to the other. The first block, into which the controlled light beam enters, will generally be in the form of a right angle prism. The second block has a second face which is disposed at an angle to the plane parallel faces of the first and second blocks. A piezoelectric drive element is mounted relative to the second block in such a manner as to rapidly move the block between a first position of near optical contact with the first block and a second position at a distance from the first block of about one wavelength of the incident light. When the second block is displaced from the first, light incident upon and entering the prism is reflected from the interface because of the principle of total internal reflection. When the second block is in near optical contact with the first, light incident upon the interface passes therethrough, enters the second block and is reflected from the second face thereof to return out of the first block at an angle displaced from the entering beam.

OBJECTS

It is, therefore, an object of the present invention to provide a novel optical shutter for switching the direction of an optical path.

It is a further object of the present invention to provide an optical shutter based upon the principle of frustrated internal reflection for switching a light beam from a condition of transmission to one of total internal reflection at a controlled interface.

It is still further object of the present invention to provide an optical shutter which is actuated by a piezoelectric drive element mounted relative to a prism in such a manner as to rapidly displace a glass armature between a position of near optical contact with the prism and a position at a distance from the prism of about one wavelength of light.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1A:
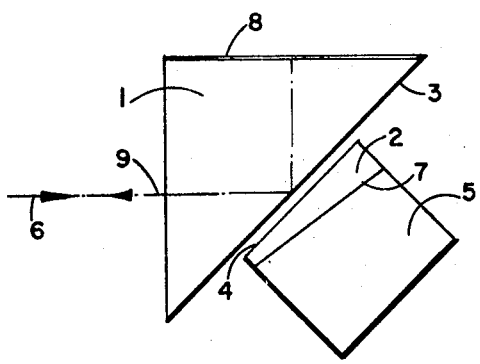
FIGS. 1a and 1b show, diagrammatically, the basic features of the present invention.
Figure 1B:
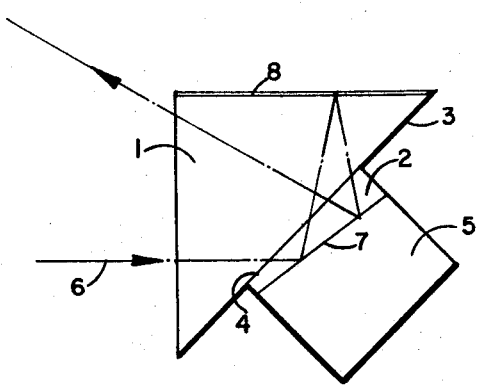

Referring now to the drawings and, more particularly, to FIGS. 1a and 1b thereof, the present optical shutter comprises two blocks of glass or other transparent media 1 and 2 having plane parallel faces 3 and 4, respectively, which are spaced in a controllable manner. An actuating means, designated 5, is positioned in contact with block 2 to displace block 2 relative to block 1. Since the incident light beam, designated 6, must be incident upon face 3 at an angle greater than the critical angle for total internal reflection, and since the entering and exiting beams, the latter designated 9, should pass normal to block 1 if reflection is to be avoided, at least three glass surfaces are found necessary and block 1 is generally in the form of a right angle prism. Block 2 may be of any form and construction found necessary for suitable disposition of that light passing face 3. In the preferred embodiment, block 2 is in the form of a wedge and has a second face 7 which is disposed at an angle with respect to face 4, for reasons which will become more apparent hereinafter.

Figure 2:
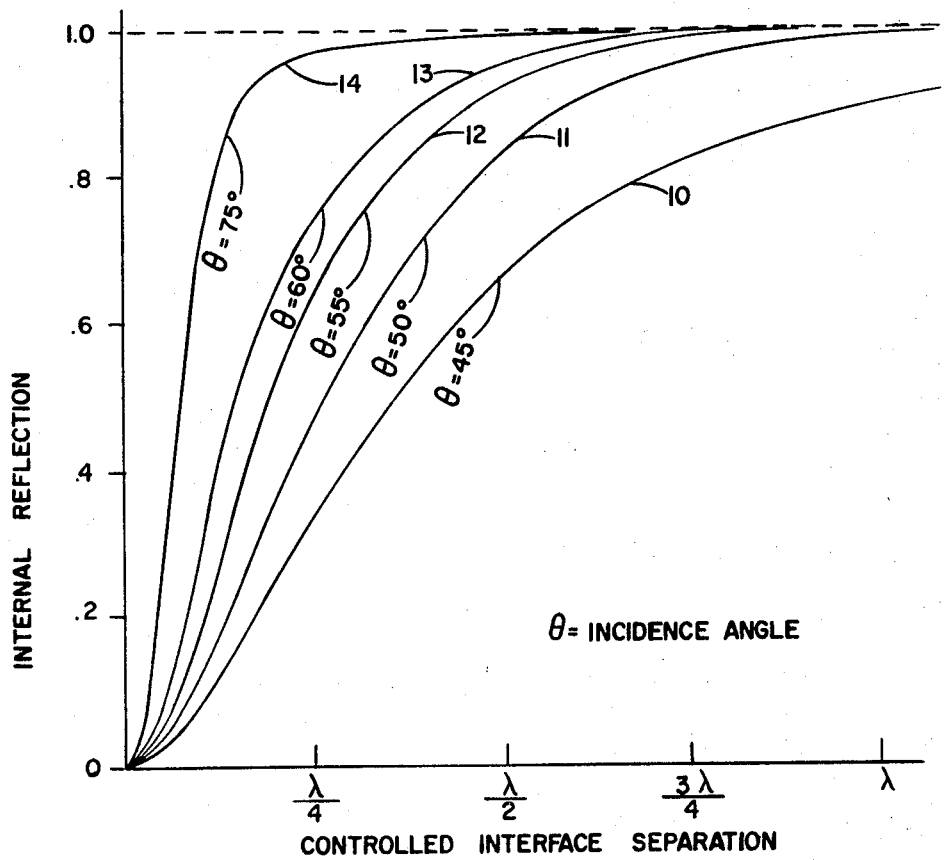
FIG. 2 is a family of curves showing internal reflection at an interface as a function of the separation between a first and a second surface for several angles of beam incidence.

Since wedge 2 is movable, it is, in effect, an armature. Armature displacements will be substantially within a distance equivalent to one wavelength of the light which is subject to control by the device. The reason for this may be best understood by referring to FIG. 2 which shows a plurality of curves of the transmittance and reflectance at the interface between faces 3 and 4 for various spacing therebetween based upon Fresnel's equations. Curves 10–14 show the variation of internal reflection at the interface as a function of the spacing between faces 3 and 4 for incidence angles of 45°, 50°, 55°, 60°, and 75°, respectively. At spacings of a wavelength or over, substantially no light is coupled from prism 1 to wedge 2 and the internal reflection is total. At spacings less than a wavelength, the total reflection is degenerate, that is, becomes known as frustrated total internal reflection and varies as shown.

Returning to FIGS. 1a and 1b, this phenomenon can be used to switch the path of incident beam 6. In FIG. 1a, with drive element 5 positioning face 4 of wedge 2 at a distance greater than one wavelength from face 3 of prism 1, incident beam 6 is totally reflected by face 3 towards face 8. If face 8 is coated so as to be totally reflective, beam 6 will be reflected back upon itself via face 3, so that exiting beam 9 coincides with incident beam 6. In FIG. 1b, with face 4 of wedge 2 driven into near optical contact with face 3 of prism 1, total internal reflection at face 3 is frustrated so that incident beam 6 passes through face 3 and is reflected from face 7. Beam 6 is then reflected by face 8, through face 3, and emerges as beam 9 at an angle to incident beam 6 which is approximately four times the angle between face 4 and face 7.

It can be readily appreciated that such a technique can be used to provide a high speed Q switch for a pulsed laser by replacing the rear reflector in the laser cavity with an optical shutter as shown in FIGS. 1a and 1b. With wedge 2 being initially positioned as shown in FIG. 1b where exiting beam 9 is displaced from incident beam 6, the lasing element would see a low Q cavity and oscillation would be prevented. The excitation source would then be flashed and the lasing element permitted to reach the metastable state, whereupon drive element 5 would be activated to drive wedge 2 away from prism 1 to the position shown in FIG. 1a. At this time, the light from the lasing element would be reflected back upon itself and a high Q optical cavity generated so as to provide a high peak power, narrow width output pulse.

With such a configuration, all of the problems encountered heretofore are eliminated. Because of the speed with which the present optical shutter can be switched, a high peak power, narrow width pulse is possible. In addition, since the beam emergent from prism 1 can only follow the paths shown in FIGS. 1a and 1b, the intensity of the beam in one path increases while the intensity of the beam in the other path decreases thereby avoiding smearing of the output beam. Finally, the present optical shutter places no limits on the average power output of the laser.

The actuating element for driving wedge 2 may employ any of a number of principles and constructions. According to the present invention, the preferred embodiment employs a piezoelectric drive element. Such an element is selected since it is, for a nominal size, capable of the required displacement, displacement force, and great rate of displacement.

Figure 3:
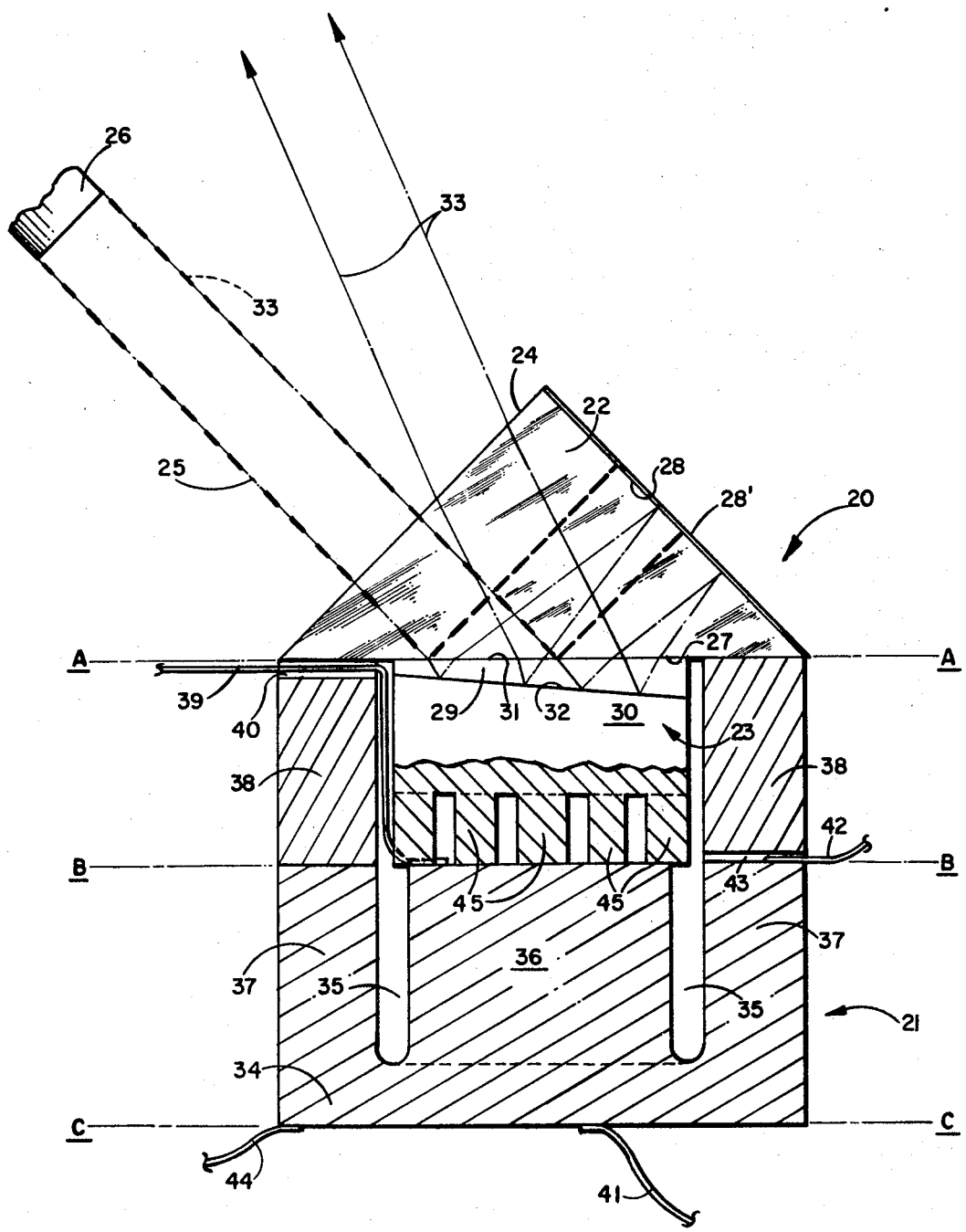
FIG. 3 is a view, partly in cross section, of the preferred embodiment of the present invention.

Referring now to FIG. 3, there is shown the preferred embodiment of a shutter constructed in accordance with the teachings of the present invention which employs the principle of frustrated total internal reflection to switch a light beam from a condition of transmission to one of total internal reflection at a controlled interface. The present shutter, designated generally as 20, is actuated by a piezoelectric drive element, designated generally as 21, mounted relative to a right angle prism 22, in such a manner as to rapidly withdraw an armature 23 from near optical contact with prism 22 (condition of high transmission) to a distance from prism 22 of about 1 wavelength of laser light. Prism 22 has a first right angle face 24 on which is incident a beam of light 25 which may be derived from a lasing element 26. Prism 22 has a hypotenuse face 27 at which reflection is controlled and a second right angle face 28 which may be coated by a material 28' so as to totally reflect all light incident thereupon. Armature 23 includes a wedge 29 of a material having a first index of refraction and a block 30 of material having a second index of refraction which is lower than the index of refraction of wedge 29. Wedge 29 has a first face 31 which is positioned parallel to face 27 of prism 22 and a second face 32 which is positioned at an angle to faces 31 and 27.

With such a configuration, in the closed position, light incident upon and entering prism 22 passes through faces 27 and 31, enters wedge 29 and is reflected from face 32 within armature 23 so as to return out of wedge 29 at an angle displaced from entering beam 25 by twice the angle between face 32 and face 31. The light beam is then reflected at face 28, again passes through face 27, is reflected from face 32 and exits from prism 22 as an output beam 33 whose path is at an angle with respect to the path of beam 25 which is four times the angle between faces 32 and 31 plus an amount caused by the refraction of beam 33 at face 24.

In the open position, with face 31 of wedge 29 withdrawn from face 27 of prism 22 a distance equal to at least one wavelength of the light in beam 25, the light incident upon and entering prism 22 is reflected at faces 27, 28 and 27, as shown in dotted form, so that output beam 33 is directed along the same path as incident beam 25.

According to the present invention, armature 23 and prism 22 are not referenced to some supporting frame as a third member, but rather, armature 23 is driven as directly as possible relative to prism 22 so as to maintain best alignment stability and to maximize stiffness for rapid response. It is also desirable to avoid thermal expansion differentials in a direction perpendicular to face 27 in order to prevent modulation change with temperature change. To accomplish these and other objectives, the design shown in FIG. 3 is employed. Reflecting wedge 29 is mounted to a stiff core 30 for stability. Core 30 is supported by a block 34 of piezoelectric material having an annular groove 35 cut therein for a distance preferable greater than half the length of block 34 so as to provide a central section 36 and a peripheral section 37. Block 34 is supported with reference to prism 22 via an intermediate spacer ring 38.

A first electrical lead 39 is connected, via a slot 40 in spacer ring 38, to the upper surface of central section 36 of piezoelectric drive element 34. A second electrical lead 41 is connected to the bottom surface of piezoelectric drive element 34. By applying a high voltage pulse of proper polarity to central section 36 via leads 39 and 41, central section 36 may be caused to expand or contract so as to move face 31 of wedge 29 toward or away from face 27 of prism 22.

The construction set forth to this point is sufficient to define a piezoelectric shutter. However, since the material in peripheral section 37 of drive element 34 is also piezoelectric, advantage can be taken of this property by operating it in an expanding or contracting mode. For this purpose, an electrical lead 42 is connected, via a slot 43 in spacer ring 38, to the upper surface of peripheral section 37 of drive element 34 and an electrical lead 44 is connected to the bottom surface of drive element 34. With these additional leads, sections 36 and 37 of piezoelectric drive element 34 can be operated with reverse polarities so that, for example, peripheral section 37 lifts central section 36 and armature 23 away from prism 22 while central section 36 contracts to further separate armature 23 and prism 22. Since peripheral section 37 can readily be allotted a greater volume than central section 36, it can easily develop a greater force to handle the combined load of armature 23 and central section 36.

It should be emphasized that either central section 36 or outer section 37 of drive element 34 acting alone is sufficient for displacing armature 23 one wavelength. However, with both sections acting simultaneously, the armature actuation time for a one wavelength displacement can be reduced. A phase lag is involved, however, since the displacement of peripheral section 37 propagates toward central section 36 and armature 23 at the velocity of sound. Thus, for an effective series mechanical drive arrangement, the excitation to central section 36 should be delayed in order to achieve simultaneity of thrust application to armature 23.

Several steps may be taken in order to maximize thermal stability and to provide freedom from mechanical hysteresis to prevent axial differential thermal expansion in a direction perpendicular to face 27. In order to prevent modulation change with temperature change, drive element 34 is preferably supported with reference to prism 22 via an intermediate spacer ring 38 which is made of the same material as block 30 of armature 23. In this manner, substantially all material between planes A and B is made identical to achieve identical coefficients of thermal expansion. The effect of wedge 29 being made of a different material may be substantially eliminated by making wedge 29 very thin relative to block 30. Similarly, all material between planes B and C is made identical. In this manner, any expansion of the material between planes A and B or B and C is automatically compensated for.

To prevent lateral differential thermal expansion between ring 38 and prism 22, which might warp prism 22, and to maintain the same or similar indices of refraction at each side of face 27 to minimize initial reflection, prism 22 is preferably made of the same material as ring 38. Lateral differential thermal expansions at the interface between armature 23 and central section 36 of drive element 34 may be accommodated by constructing the bottom side of armature 23 as a plurality of flexible posts 45 made integrally with armature 23 by cross-slotting adjacent the joint between armature 23 and central section 36. Thus, distortion is localized and not coupled to face 27.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A shutter for switching the optical path of a beam of light comprising:
   a prism of transparent material, said beam of light being internally incident on one face of said prism at an angle greater than the critical angle;
   a wedge of transparent material having first and second angularly displaced faces, said first face being positioned parallel to said one face of said prism; and
   means for driving said wedge relative to said prism between a first position wherein said first face of said wedge and said one face of said prism are in near optical contact and a second position wherein said first face of said wedge and said one face of said prism are spaced by a distance of at least $\lambda$ where $\lambda$ = the wavelength of said light beam,
   said prism is a right angle prism and said one face is the hypotenuse face of said right angle prism, said beam of light passing through one of the right angle faces of said prism and being incident on said hypotenuse face, said beam of light being totally internally reflected by said hypotenuse face when said wedge is in said second position, said beam of light passing through said hypotenuse face and being internally incident upon the second face of the wedge at an angle greater than the critical angle and being internally reflected by said second face of said wedge when said wedge is in said first position, the index of refraction of a material external the second face of the wedge being lower than the index of refraction of the wedge.

2. The shutter of claim 1 further comprising means for reflecting the light reflected by said hypotenuse face and said second face of said wedge back toward said hypotenuse face so that said beam of light emerges from said one right angle face along the same path as the incident beam when said wedge is in said second position and at an angle to said incident beam when said wedge is in said first position.

3. The shutter of claim 1 wherein the other of the right angle faces of said prism is totally reflective so that said beam of light is reflected back upon itself when said wedge is in said second position, said beam of light emerging from said one right angle face at an angle to the incident beam when said wedge is in said first position.

4. The shutter of claim 3 further comprising:
   a block of material having first and second opposite faces, said first face being in optical contact with said second face of said wedge, the index of refraction of said block of material being less than that of said wedge so that light passing through said hypotenuse face of said prism when said wedge is in said first position is totally internally reflected by said second face of said wedge.

5. The shutter of claim 4 wherein said means for driving said wedge comprises:
   a piezoelectric element having first and second opposite faces, said first face being in contact with said second face of said block of material, said first face of said piezoelectric element and said second face of said block of material being positioned parallel to said hypotenuse face of said prism and said first face of said wedge.

6. The shutter of claim 5 wherein said piezoelectric element has an annular groove therein so as to divide said piezoelectric element into a central section and a peripheral section, said second face of said block of material being in contact with said central section of said piezoelectric element, including means for supporting said block and said wedge relative to said prism being in contact with said peripheral section of said piezoelectric element, and wherein said means for driving said wedge further comprises:
  a first electrical lead operatively coupled to said first face of said central section of said piezoelectric element; and
  a second electrical lead operatively coupled to said second face of said piezoelectric element whereby a voltage pulse applied to said first and second leads causes said central section of said piezoelectric element to contract or expand to move said wedge relative to said prism.

7. The shutter of claim 6 further comprising:
  a third electrical lead operatively coupled to said first face of said peripheral section of said piezoelectric element whereby a voltage pulse applied to said second and third leads of a polarity opposite to said first-mentioned voltage pulse causes said peripheral section of said piezoelectric element to contract or expand to provide an additional force to move said wedge relative to said prism.

8. The shutter of claim 7 wherein the voltage pulse applied to said first and second leads is delayed relative to the voltage pulse applied to said second and third leads.

9. The shutter of claim 1 further comprising:
  a block of material having first and second opposite faces, said first face being in optical contact with said second face of said wedge, the index of refraction of said block of material being less than that of said wedge so that light passing through said one face of said prism when said wedge is in said first position is totally internally reflected by said second face of said wedge.

10. The shutter of claim 9 wherein said means for driving said wedge comprises:
  a piezoelectric element having first and second opposite faces, said first face being in contact with said second face of said block of material.

11. The shutter of claim 10, including means for supporting said block and said wedge which are made of the same material.

12. The shutter of claim 11 wherein said prism is made of the same material as said means for supporting said block and said wedge.

13. The shutter of claim 12 wherein the side of said block of material adjacent said second face is cross-slotted to form a plurality of posts to prevent differential thermal expansion at the interface between said second face of said block of material and said first face of said piezoelectric element in a direction perpendicular to said interface.

14. The shutter of claim 10 wherein said first face of said piezoelectric element and said second face of said block of material are positioned parallel to said one face of said prism and said first face of said wedge.

15. The shutter of claim 14 wherein said means for driving said wedge further comprises:
  a first electrical lead operatively coupled to said first face of said piezoelectric element; and
  a second electrical lead operatively coupled to said second face of said piezoelectric element whereby a voltage pulse applied to said first and second leads causes said piezoelectric element to contract or expand to move said wedge relative to said prism.

16. The shutter of claim 15 wherein said piezoelectric element has an annular groove therein so as to divide said piezoelectric element into a central section and a peripheral section, said second face of said block of material being in contact with said central section of said piezoelectric element, said means for supporting said block and said wedge relative to said prism being in contact with said peripheral section of said piezoelectric element.

17. The shutter of claim 16 wherein said first electrical lead is operatively coupled to said central section of said piezoelectric element.

18. The shutter of claim 17 further comprising:
  a third electrical lead operatively coupled to said first face of said peripheral section of said piezoelectric element whereby a voltage pulse applied to said second and third leads of a polarity opposite to said first-mentioned voltage pulse causes said peripheral section of said piezoelectric element to contract or expand to provide an additional force to move said wedge relative to said prism.

19. The shutter of claim 18 wherein the voltage pulse applied to said first and second leads is delayed relative to the voltage pulse applied to said second and third leads.

20. The shutter of claim 18 wherein said means for supporting said block and said wedge is made of the same material as said block of material whereby substantially all material between said first face of said piezoelectric element and said one face of said prism is identical and all material between said first face of said piezoelectric element and said second face of said piezoelectric element is identical to prevent differential thermal expansion in a direction perpendicular to said one face of said prism.

* * * * *